United States Patent [19]

Sehier et al.

[11] Patent Number: 5,027,371
[45] Date of Patent: Jun. 25, 1991

[54] SELF-ADAPTIVE EQUALIZER CIRCUIT FOR A DIFFERENTIALLY COHERENT DEMODULATION INSTALLATION

[75] Inventors: Philippe Sehier; Ghassan K. Kaleh, both of Levallois Perret, France

[73] Assignee: Alcatel Transmission Par Faisceaux Hertziens, Cedex, France

[21] Appl. No.: 459,411

[22] Filed: Dec. 29, 1989

[30] Foreign Application Priority Data

Dec. 30, 1988 [FR] France ............... 88 17507

[51] Int. Cl.$^5$ ............................................. H04B 3/04
[52] U.S. Cl. ................................... 375/15; 375/84
[58] Field of Search ................... 375/12, 14, 15, 16, 375/56, 27, 84, 85; 364/724.19, 724.2; 333/18; 329/304

[56] References Cited

U.S. PATENT DOCUMENTS

| | | | |
|---|---|---|---|
| 4,035,725 | 7/1977 | Guidoux | 375/15 |
| 4,097,807 | 6/1978 | Fujimura | 375/14 |
| 4,140,974 | 2/1979 | Lindner | 375/102 |
| 4,247,940 | 1/1981 | Mueller et al. | 375/15 |

OTHER PUBLICATIONS

1987 IEEE International Symposium on Circuits and Systems, Philadelphia, Pa., May 4–7, 1987, vol. 2, pp. 422–425, IEEE, New York, U.S.: T. B. Evans et al., "Variable Stepsize Methods for the LMS Adaptative Algorithm", col. 1, line 29–col. 2, line 5, FIG. 1.

IEEE International Conference on Communications, Minneapolis, Minn., Jul. 17–19, 1974, pp. 25D1-25D-5. IEEE New York, U.S.: J. W. Barksdale et al.: "A Linear Digital Equalizer for Fast Initialization", FIG. 1, pp. 25D-2, col. 2, lines 23-32.

*Primary Examiner*—Benedict V. Safourek
*Attorney, Agent, or Firm*—Sughrue, Mion, Zinn Macpeak & Seas

[57] ABSTRACT

A self-adaptive equalizer circuit for a receive using differential demodulation, and in particular for a receiver using a plurality of paths in diversity (1, 2). For each diversity path (1, 2) there is a self-adaptive filter (18, 19) placed before the differential demodulation. The coefficients (C0 to Cn) of the filter are updated at each instant KT, where T is the symbol rate period, using the formula:

$$Ci(k) = Ci(k-1) - \mu \cdot y(k-1) \cdot x(k-1)^* \cdot e(k)$$

where $\mu$ is a real number much less than 1, e.g. equal to 0.001, where $Ci(k)$ is the value given to the coefficient (Ci) at instant $kT$; $Ci(k-1)$ is the value taken by the same coefficient Ci at the instant $(k-1)T$; $y(K-1)$ is the output signal from the self-adaptive filter, the symbol being sampled at the symbol rate of period T; $x(k-i)^*$ is the complex conjugate value of the sample $x(k-i)$ present in the filter at said instant $kT$ and relating to the coefficient Ci; and $e(k)$ is the above-mentioned error at the instant $kT$.

3 Claims, 2 Drawing Sheets

SELF-ADAPTIVE EQUALIZER CIRCUIT FOR A DIFFERENTIALLY COHERENT DEMODULATION INSTALLATION

BACKGROUND OF THE INVENTION

The present invention relates to a self-adaptive equalizer circuit for an installation which performs differentially coherent demodulation, more commonly called "differential demodulation". It is particularly applicable to the digital transmission of messages via a multipath channel whose transmittance is unknown a priori, thereby causing intersymbol interference to arise in the received message, e.g. digital transmission by radio beams using a tropospheric channel. The invention is applicable to installations that use linear modulation that can be demodulated differentially, such as binary phase shift keying (BPSK) and quarternary phase shift keying (QPSK), and it is advantageously applicable to receivers capable of operating in diversity mode.

The presence of intersymbol interference tends to degrade the performance of the receiver used in a digital transmission by radio beam very considerably. To remedy this effect, when using coherent modulation, it is known that the technique of self-adaptive equalization can be used by placing a self-adaptive filter after the demodulator.

Self-adaptive equalization is a known technique which consists in causing the received signals to pass through a self-adaptive filter whose function is to reduce intersymbol interference as much as possible. In conventional devices, this filter has a finite impulse response for so-called "linear" equalizer. It comprises two portions in "decision feedback" equalizers: a portion which acts on the received signal and another portion which acts on the symbols decided upon. In the systems that are commonest because they are the simplest, the filter optimization criterion is minimizing mean square error, and the filter coefficients are updated by the stochastic gradient algorithm.

With coherent demodulation, the algorithm for adapting the coefficients is well known, and numerous systems have already been made.

The drawback with coherent demodulation is the need to estimate the phase of the received signal. This is particularly difficult to estimate since the channels under consideration give rise to rapid phase variations that can cause the receiver to loose phase lock.

One way of avoiding the need to estimate phase is to use differentially coherent demodulation, more commonly called "differential demodulation". In this technique, the preceding sample serves as a "noisy" phase reference for the signal sample currently being processed. This simplifies receivers, but at the cost of a theoretical degradation in error rate performance.

As with coherent demodulation, the performance of differential demodulation is degraded when the transmission channel is not perfect. Past tests with self-adaptive equalization have been unsuccessful, firstly because it is not possible to place a self-adaptive filter at the outlet from a differential demodulator, and secondly because the known algorithms for updating filter coefficients do not apply to a circuit for differential demodulation.

SUMMARY OF THE INVENTION

The invention seeks to remedy this drawback and to enable the principle of self-adaptive equalization to be applied to differential demodulation for the purpose of improving transmission performance in the presence of dispersive channels. To this end, the present invention provides a self-adaptive equalizer circuit for an installation for differentially coherent demodulation, the circuit comprising, on each reception path, a self-adaptive filter (known per se) placed upstream from the differential demodulator on said path, the self-adaptive filter being associated with a coefficient-calculating unit, which unit receives the error (e) from the decision and error calculation circuit situated downstream from the differential demodulator as well as the output signal from said self-adaptive filter, the coefficient-calculating unit updating each coefficient $C0(k)$, $C1(k)$, $C2(k)$, ..., $Ci(k)$, ..., of said self-adaptive filter at each instant (kT), with the coefficients being calculated using the equation:

$$Ci(k) = Ci(k-1) - \mu.y(k-1).x(k-i)^*.e(k)$$

in which:

$Ci(k)$ is the value given to the coefficient (Ci) at instant kT; $Ci(k-1)$ is the value taken by the same coefficient Ci at the instant $(k-1)T$; $\mu$ is a positive real number very much less than 1 and defines the rate of adaptation of the filter; $y(k-1)$ is the output signal from the self-adaptive filter, said signal being sampled at the symbol rate of period T; $x(k-i)^*$ is the complex conjugate value of the sample $x(k-i)$ present in the filter at said instant kT and relating to the coefficient Ci; and $e(k)$ is the above-mentioned error (e) at the instant kT.

BRIEF DESCRIPTION OF THE DRAWINGS

An embodiment of the invention is described by way of example with reference to the accompanying drawings, in which.

DETAILED DESCRIPTION

Figure 1:
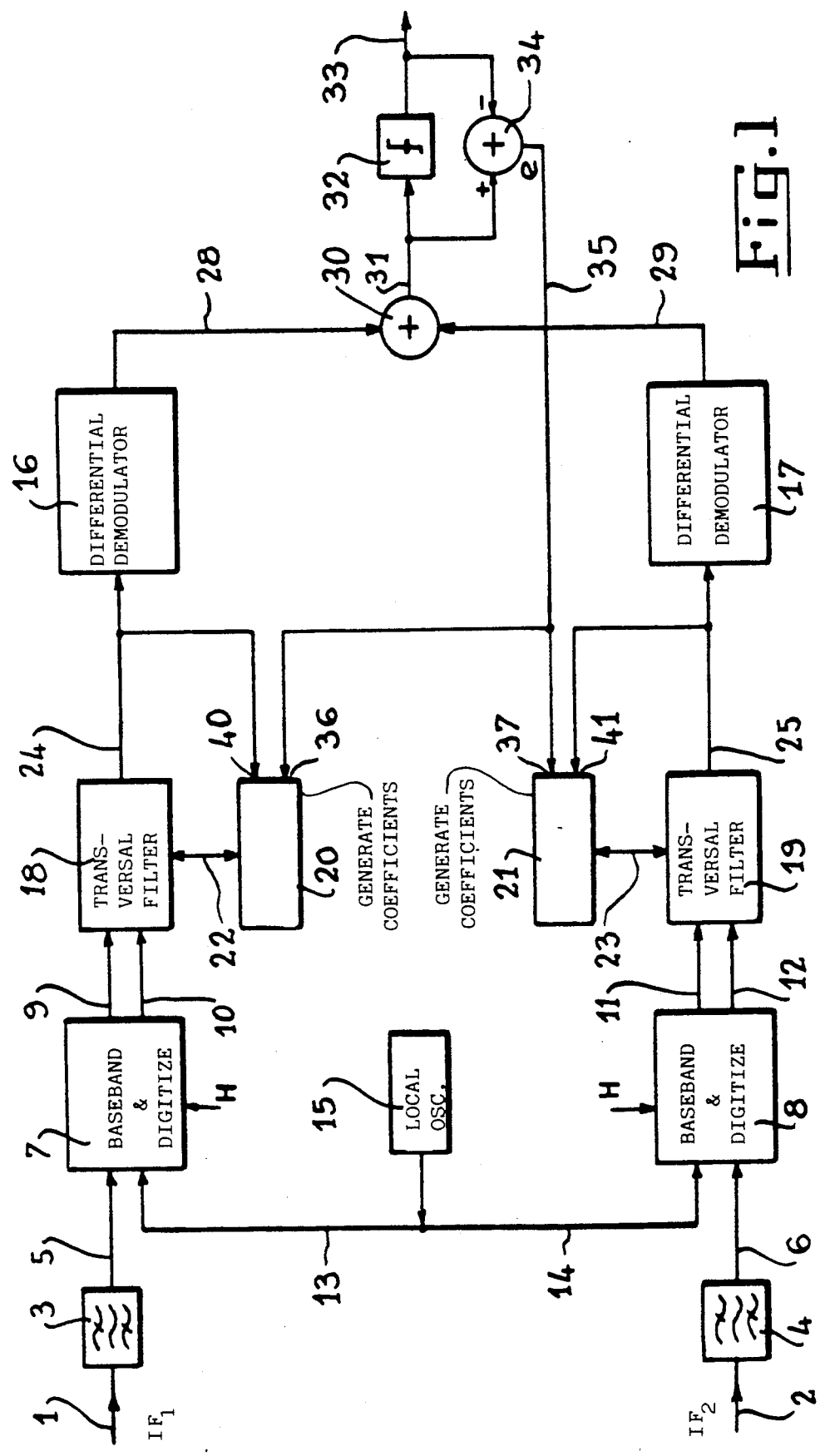
FIG. 1 is an overall block diagram of the self-adaptive equalizer.

With reference initially to FIG. 1, the signal as received and transposed to an intermediate frequency (e.g. 70 MHz) on a first diversity path is applied at 1 to a reception filter 3. Similarly, the signal as received and transposed to intermediate frequency over a second diversity path is applied at 2 to another reception filter 4. At this stage, the signals are naturally analog signals.

These signals, respectively present at 5 and at 6, are then transposed into baseband, i.e. to a carrier frequency of 0, and they are digitized in two quadrature channels (respectively 9 & 10 and 11 & 12) by two conventional circuits respectively 7 and 8. Each of these baseband and quadrature digitizing circuits 7 and 8 receives, in addition to its input signal (5 or 6 as the case may be), both a clock signal H (whose period in this example is equal to the intersymbol spacing T), and a signal at a fixed frequency delivered by a local oscillator 15 over respective paths 13 and 14. The digitized signals at 9 & 10 and at 11 & 12 respectively are complex symbols, as is well known in signal theory.

In accordance with a first aspect of the invention, the successive complex symbols as sampled at T in this particular example, and present on the two above-mentioned pairs of quadrature paths (9 & 10 and 11 & 12, respectively) are passed through respective self-adaptive filters 18 and 19 prior to being applied to respective differential demodulators 16 and 17. The filters 18 and 19 are highly conventional in structure as shown in FIG. 2 which is described in greater detail below.

Figure 2:
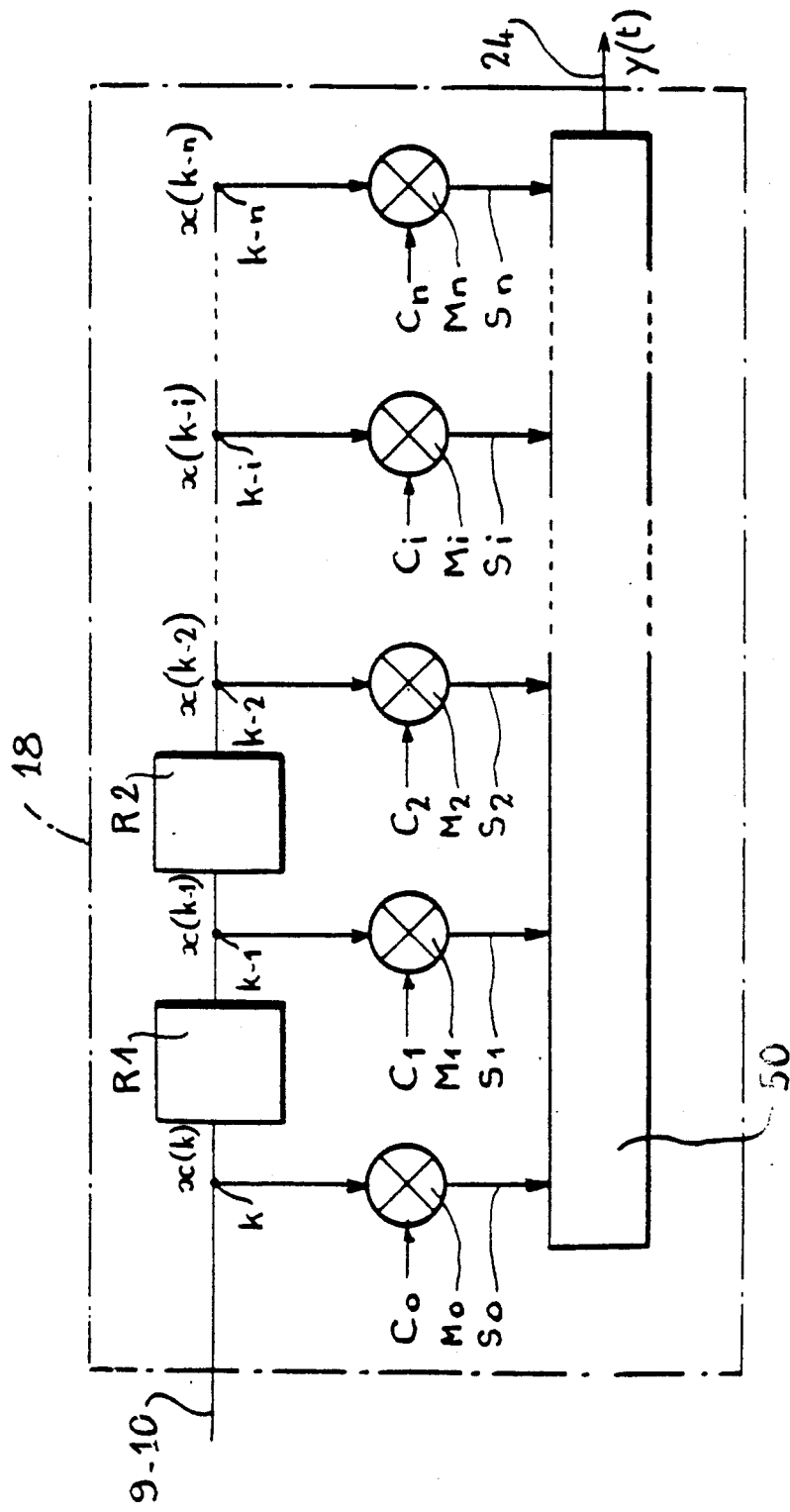
FIG. 2 is a block diagram of one of the two self-adaptive filters used in the equalizer of FIG. 1.

Each of these self-adaptive filters 18 and 19 is connected in conventional manner via respective two-way links 22 and 23 to respective logic units 20 and 21 for calculating the filter coefficients C0, C1, C2, ..., Ci, ..., Cn (FIG. 2).

The digital signals 24 and 25 respectively output by the self-adaptive filters 18 and 19 are then respectively applied to the above-mentioned differential demodulators 16 and 17.

The respective output signals 28 and 29 from the differential demodulators 16 and 17 are then combined by being passed through a summing circuit 30 (naturally, if there were only one diversity channel, then the summing circuit 30 would be omitted).

The digital signal output at 31 from said adding circuit 30 is then applied to a decision circuit 32 whose output 33 constitutes the output of the self-adaptive equalizer of FIG. 1.

An error calculating circuit 32 compares the input and output signals of the decision unit 32 as present as 31 and 33 respectively, and the output 35 from the circuit 34 is applied to respective data inputs 36 and 37 of each of the logic units 20 and 21 for calculating the above-mentioned coefficients.

These coefficient-calculating units 20 and 21 also receive the output signals at 24 and 25 respectively from the above-mentioned self-adaptive filters 18 and 19 via respective further data inputs 40 and 41.

With reference now to FIG. 2, the self-adaptive filter shown is the filter 18, for example, but it should be understood that the filter 19 is identical thereto. In this diagram, the complex digital symbol input into the filter at instant kT (where k is an integer) is designated by the notation $x(k)$, and the symbol that was input at the instant $(k - 1)T$ is designated by the notation $x(k - 1)$, ..., the symbol that was input at instant $(k - i)T$ is designated by $x(k - i)$, ... and the symbol which was input at instant $(k - n)T$ is designated by $x(k - n)$. In order to facilitate understanding, the references k, k - 1, K - 2, ..., k - i, ..., k - n are used in FIG. 2 to designate points in the filter 18 at which, at instant $t = kT$, the above-mentioned samples $x(k)$, $x(k - 1)$, $x(k - 2)$, ..., $x(k - i)$, ..., $x(k - n)$ are present. In entirely conventional matter for a self-adaptive filter, these points are separated from one another by respective delay circuits R1, R2, ..., each of which introduces a delay equal to the period of the sampling signal H, i.e. T in the present example (and naturally if oversampling is used, then each of them introduces a delay of less than T).

In conventional manner, each complex digital sample $x(k)$ to $x(k - n)$ is applied to a first input of a respective multiplier M0, M1, M2, ..., Mi, ..., Mn whose second input receives the respective coefficient C0, C1, C2, ..., Ci, ..., Cn from the coefficient-calculating circuit (FIG. 1). The respective outputs S0, S1, S2, ..., Si, ..., Sn from these multipliers M0 to Mn are conventionally applied to a summing circuit 50 whose output delivers the equalized signal 24.

According to the other essential aspect of the invention, each of the coefficients C0, C1, C2, ..., Ci, ..., Cn of the filter is updated by the above-mentioned circuit 20 at each instant kT, by using the following equation:

$$Ci(k) = Ci(k - 1) - \mu.y(k - 1).x(K - i)^*.e(k)$$

in which:

$Ci(k)$ is the value taken by the coefficient Ci at instant kT;

$Ci(k - 1)$ is the value taken by the same coefficient Ci at instant $(k - 1)T$, and which it has therefore retained throughout the time interval between $(K - 1)T$ and kT;

$\mu$ is a real positive number very much less than 1 and which defines the adaptation rate of the filter 18, for example the coefficient $\mu$ may be about 0.001;

$x(k - i)^*$ is the value of the complex conjugate of the above-defined sample $x(k - i)$ present at the above-mentioned point $(k - i)$ at the instant kT; and $e(k)$ is the above-mentioned error present on the output wire 35 at the instant kT.

Naturally the invention is not limited to the embodiment described above. It is equally applicable to reception with diversity 1 (on a single channel) and to reception with diversity greater than 2. However, particularly in the event of transmission via a tropospheric channel, it is preferable to use transmission with diversity greater than or equal to 2 in order to mitigate signal fading phenomena.

Advantageously, this equalizer is used with oversampling: a well-known technique for use with equalizers for coherent demodulation. The modifications then required to FIGS. 1 and 2 are then easily deduced from conventional coherent demodulation systems. The present description is given in terms of synchronous sampling for reasons of clarity.

We claim:

1. A self-adaptive equalizer circuit for differentially coherent demodulation, said circuit comprising:

at least a first differential demodulator receiving an input and providing an output;

a first filter disposed upstream of said first differential demodulator and receiving at least one input and generating an output $y(k)$ in accordance with filter coefficients;

a first baseband and quadrature digitizing circuit for receiving input signals, converting them to baseband and digitizing them into in-phase and quadrature signals for provision to said first filter;

a decision circuit responsive to the output from said differential demodulator for generating an output constituting an output of the self-adaptive equalizer;

an error calculation circuit responsive to input and output signals of said decision circuit for generating error signals $e(k)$; and a first coefficient calculating unit for calculating the coefficients (C), C1, C2, ..., Ci, ..., Cn) for the first filter in accordance with output signals $y(k)$ from the filter and in accordance with said error signals $e(k)$, said coefficients being calculated at each instant kT, where k is an integer and T is an intersymbol spacing, in accordance with the following equation:

$$Ci(k) = Ci(k - 1) - \mu.y(k - 1).x(k - i)^*.e(k)$$

in which:

$Ci(k)$ is the value given to coefficient Ci at instant kT:

$Ci(k - 1)$ is the value taken by said coefficient Ci at the instant $(K - 1)T$; $\mu$ is a positive real number substantially less than 1; $y(K - 1)$ is an output signal from said filter at instant $(k - 1)T$; $x(k - i)^*$ is a complex conjugate value of a sample x(k - i) present in the filter at said instant kT and relating to the coefficient (Ci); and e(k) is the error at instant kT.

2. A self-adaptive equalizer according to claim 1, wherein said first filter and first differential demodulator are disposed in a first reception path, said circuit further comprising:
- a second differential demodulator disposed in a second reception path for receiving an input and providing an output;
- a second filter disposed upstream of said second differential demodulator and receiving at least one input and generating an output y'(k) in accordance with second filter coefficients;
- a second baseband and quadrature digitizing circuit for receiving input signals, converting them to baseband and digitizing them into in-phase and quadrature signals for provision to said second filter;
- a second coefficient calculating unit for calculating the coefficients (C0', C1', C2', ..., Ci', ..., Cn') for the second filter in accordance with output signals y(k) from the second filter and in accordance with said error signals e(k), said coefficients being calculated at each instant kT in accordance with the following equation:

$$Ci'(k) - Ci'(k - 1) - \mu.y'(k - 1).x'(k - i)^*.e(k)$$

in which:
Ci'(k) is the value given to coefficient Ci' at instant kT: Ci'(k - 1) is the value taken by said coefficient Ci' at the instant (k - 1)T; $\mu$ is a positive real number substantially less than 1; (k - 1) is an output signal from said second filter at instant (k - 1)T; and x'(k - i)* is a complex conjugate value of a sample x'(k - i) present in the second filter at said instant kT and relating to the coefficient (Ci');
said decision circuit responsive to outputs from both of said first and second differential demodulators for generating an output constituting an output of the self-adaptive equalizer.

3. A self-adaptive equalizer circuit according to claim 1, wherein $\mu$ has a value of about 0.001.

* * * * *